United States Patent [19]
Kishimoto et al.

[11] Patent Number: 5,693,685
[45] Date of Patent: Dec. 2, 1997

[54] THERMAL INSULATOR AND METHOD FOR PRODUCING THE SAME

[75] Inventors: Yoshio Kishimoto; Masa-aki Suzuki, both of Hirakata; Takashi Hashida; Fumihiro Inagaki, both of Osaka, all of Japan

[73] Assignee: Matsushita Electric Industrial Co., Ltd., Kadoma, Japan

[21] Appl. No.: 638,308

[22] Filed: Apr. 26, 1996

Related U.S. Application Data

[63] Continuation of Ser. No. 287,659, Aug. 9, 1994, abandoned.

[30] Foreign Application Priority Data

| Aug. 10, 1993 | [JP] | Japan | 5-198133 |
| Aug. 20, 1993 | [JP] | Japan | 5-206243 |
| Feb. 22, 1994 | [JP] | Japan | 6-023933 |

[51] Int. Cl.$^6$ ............................................. C08J 9/08
[52] U.S. Cl. .......................... 521/130; 521/131; 521/143; 521/145; 521/146; 521/155; 528/44; 528/50; 528/55; 528/58; 252/62
[58] Field of Search ............................. 521/130, 131, 521/143, 145, 146, 155; 528/44, 50, 45, 58; 252/62

[56] References Cited

U.S. PATENT DOCUMENTS

| 3,281,378 | 10/1966 | Garber et al. ............... 260/2.5 |
| 3,459,628 | 8/1969 | Dixon et al. ................. 161/161 |
| 4,020,023 | 4/1977 | Wolgemuth ................ 260/2.5 A |
| 4,309,532 | 1/1982 | Cuscurida et al. ............. 536/4 |
| 4,882,363 | 11/1989 | Neuhaus et al. ............. 521/122 |
| 5,109,032 | 4/1992 | Vekado et al. ............... 521/110 |
| 5,278,195 | 1/1994 | Volkert et al. ............... 521/98 |

FOREIGN PATENT DOCUMENTS

| 1231040 | 5/1971 | European Pat. Off. . |
| 0424539 | 5/1991 | European Pat. Off. . |
| 1351368 | 10/1965 | France . |
| 1580014 | 8/1969 | France . |
| 52-55047 | 5/1977 | Japan . |
| 57-133870 | 8/1982 | Japan . |
| 63-21475 | 1/1988 | Japan . |
| 272293 | 3/1990 | Japan . |
| 2205582 | 8/1990 | Japan . |
| 3292113 | 12/1991 | Japan . |

OTHER PUBLICATIONS

Search Report for European Appl. 94112506.4 mailed Dec. 5, 1994.

*Primary Examiner*—James J. Seidleck
*Assistant Examiner*—Duc Truong
*Attorney, Agent, or Firm*—Renner, Otto, Boisselle & Sklar

[57] ABSTRACT

A thermal insulator of the present invention includes a foam containing solidified $CO_2$ gas. A method for producing the thermal insulator includes the steps of: mixing a metal compound selected from the group consisting of a metal oxide and a metal hydroxide, water, a polyol component, and an isocyanate component to generate a mixture; foaming the mixture in a container to generate closed-cells made of a water-foamed polyurethane; and allowing $CO_2$ gas generated during the foaming step to react with the selected metal compound to solidify the $CO_2$ gas, thereby depressurizing the closed-cells in the closed-celled foam.

26 Claims, 3 Drawing Sheets

THERMAL INSULATOR AND METHOD FOR PRODUCING THE SAME

This is a continuation of application Ser. No. 08/287,659 filed Aug. 9, 1994, now abandoned.

BACKGROUND OF THE INVENTION

1. Field of the Invention

The present invention relates to a thermal insulator used for a refrigerator, a freezer, and the like, and a method for producing the same.

2. Description of the Related Art

In the past, plastic foams such as a polyurethane foam and a polystyrene foam has been mainly utilized as thermal insulators for refrigerators and freezers. Most of these foams are closed-celled foams. Superior thermal insulators have been produced by using, as a blowing agent for forming cells, chlorofluorocarbon gas having satisfactory blowing properties and low thermal conductivity.

In particular, a polyurethane foam has been widely used since it can be molded by foaming in place. For example, Japanese Laid-Open Patent Publication No. 2-205582 discloses the use of water-foamed polyurethane as a thermal insulator. The water-foamed polyurethane is obtained as follows: Isocyanate which is a material for polyurethane is reacted with water to form a urea bond and to foam by generating $CO_2$ gas. In addition, a thermal insulator made of polyurethane foam has been used, which utilizes chlorofluorocarbons and water as a blowing agent for the purpose of reducing the amount of chlorofluorocarbons to be used. In this case, for making the best use of excellent insulation characteristic of chlorofluorocarbons, zeolite, which adsorbs $CO_2$ gas and water vapor in the closed-cells of the polyurethane foam in a thermal equilibrium reaction, is sometimes mixed with the polyurethane foam (e.g., Japanese Laid-Open Patent Publication No. 3-292113 and U.S. Pat. No. 4,882,363).

Furthermore, there is a vacuum insulating panel as a thermal insulator having satisfactory insulation characteristics. The vacuum insulating panel is obtained by sealing a thermal insulating material in an airtight container and depressurizing so as to decrease thermal conductivity. Thus, the vacuum insulating panel has extremely high insulation characteristics. A number of such vacuum insulating panels using the following materials and structures have been proposed. Inorganic fine insulating powders of pearlite, silica, or the like, or a polyurethane foam or a honeycomb structure of open-celled foams are sealed under vacuum as a core material in a container having a high gas barrier property. As the materials for the container, a metal and plastic laminated film and a plastic multilayer film together with a gas adsorbent have been used. For example, Japanese Laid-Open Patent Publication Nos. 57-133870, 63-21475, and 72293 disclose a vacuum insulating panel in which rigid phenol polyurethane foam is sealed as a core material in a container of a metal and plastic laminated film.

In general, as materials for a polyurethane foam, a polyol component and an isocyanate component are used. Examples of the isocyanate component include diphenylmethane diisocyanate (MDI), tolylene diisocyanate (TDI), and modified compounds thereof. Examples of the polyol component include polyetherpolyol and polyesterpolyol. As a material for the polyol components, those obtained by ring-opening polymerization of polyhydric alcohol such as polypropylene glycol with cyclic ether such as ethylene oxide are used. Depending upon the use, those materials are modified (e.g., U.S. Pat. No. 4,309,532).

The use of thermal insulators using chlorofluorocarbons having low thermal conductivity is regulated because of its environmental disruption such as the destruction of the ozone layer and the warming of the earth's atmosphere (greenhouse effect). Under this circumstance, the study of an alternate chrolofluorocarbon blowing agent has been conducted. Moreover, the study of an insulating foam without using chlorofluorocarbons as a blowing agent has been conducted.

The inventors of the present application has noticed that the conventional foam in which zeolite powders are dispersed (e.g., Japanese Laid-Open Patent Publication No. 3-292113) has the following various problems. The $CO_2$ gas reducing function of zeolite is based on an adsorption-desorption equilibrium reaction. Therefore, zeolite can not remove the $CO_2$ gas sufficiently. Moreover, zeolite adsorbs water as well as the $CO_2$ gas, so that zeolite powders dispersed in a polyurethane foam using water for a foaming reaction adsorbs water and cannot sufficiently adsorb the $CO_2$ gas. Furthermore, the adsorption rate of $CO_2$ gas by zeolite is relatively high, therefore the $CO_2$ gas generated by the reaction of water and isocyanate cannot function sufficiently as a blowing agent. Therefore, it is essential to use another blowing agent such as chlorofluorocarbon used in Japanese Laid-Open Patent Publication No. 3-292113.

Furthermore, a foam having depressurized cells has a problem in that air penetrates to the depressurized cells with time when the barrier property of the container of the foam is low, resulting in the decrease in thermal insulation characteristic. In order to solve this problem, a high nitrile ABS plastic having a high barrier property is used as a material for the container in Japanese Laid-Open Patent Publication No. 3-292113. However, in the same way as in the conventional vacuum insulating panel, the thermal insulator having the above structure has a problem in that the thermal insulation characteristic is remarkably decreased when pinholes are formed in the container.

The vacuum insulating panel is excellent in insulation characteristics but has some problems. While a thermal insulator obtained by foaming polyurethane in place can be easily injected into housings with various shapes, the vacuum insulating panel has a predetermined shape, requiring an additional step of attaching the vacuum insulating panel to a housing.

In order to keep insulation characteristics uniform on the surface of the housing, it is required to fill the gap between the vacuum insulating panel and the housing. For this purpose, the polyurethane foams are used with the vacuum insulating panel. In addition, in order to maintain the depressurized state for a long period of time, the container for the vacuum insulating panel is required to have low gas permeability, and in order to suppress the increase in gas in the container, an adsorbent excellent for adsorbing gas is required.

SUMMARY OF THE INVENTION

The thermal insulator of this invention, comprises a foam containing solidified $CO_2$ gas.

In one embodiment of the present invention, the foam is a closed-celled foam including depressurized closed-cells.

In another embodiment of the present invention, the closed-celled foam is a water-foamed rigid polyurethane.

In another embodiment of the present invention, the solidified $CO_2$ gas is a metal salt selected from the group consisting of a metal carbonate and a metal hydrogencarbonate.

In another embodiment of the present invention, the metal salt is a thermally stable metal salt.

In another embodiment of the present invention, the thermally stable metal salt comprises an alkaline-earth metal selected from the group consisting of a calcium salt, a barium salt, and a magnesium salt.

In another embodiment of the present invention, the closed-celled foam comprises a plastic having a free amino group, a metal compound selected from the group consisting of a metal halide and a metal phosphate, and a metal carbonate.

In another embodiment of the present invention, the free amino group is a lysine.

In another embodiment of the present invention, the solidified $CO_2$ gas comprises an alternant copolymer of an epoxide compound and $CO_2$ gas.

In another embodiment of the present invention, the alternative copolymer comprises, as a copolymerization catalyst, a compound of metal selected from the group consisting of zinc, cobalt, aluminum, and tin.

In another embodiment of the present invention, the copolymerization catalyst is selected from the group consisting of a mixture of an organic zinc compound and a compound having active hydrogen with at least two valences, an organic zinc compound carried on a metal oxide, an aliphatic zinc carboxylate, and a zinc halide carried on a metal oxide.

In another embodiment of the present invention, the closed-celled foam is filled in a housing having a metallic outer housing and a resinous inner housing.

In another embodiment of the present invention, the foam containing the solidified $CO_2$ gas is filled in a sealed air-tight container.

In another embodiment of the present invention, the foam is a closed-celled foam.

According to another aspect of the present invention, a method for producing a thermal insulator comprising a foam including depressurized cells, comprises the steps of: generating a foam including cells containing $CO_2$ gas; and solidifying the $CO_2$ gas, thereby depressurizing the cells.

In one embodiment of the present invention, the foaming step is a step of generating a closed-celled foam made of a water-foamed polyurethane.

In another embodiment of the present invention, a method for producing a thermal insulator further comprises the step of:

mixing a metal compound selected from the group consisting of a metal oxide and a metal hydroxide, water, a polyol component, and an isocyanate component to generate a mixture, wherein the foaming step is a step of foaming the mixture in a container to generate a closed-celled foam made of a water-foamed polyurethane, and the solidifying and depressurizing step is a step of allowing $CO_2$ gas generated during the foaming step to react with the metal compound to solidify the $CO_2$ gas, thereby depressurizing closed-cells in the closed-celled foam.

In another embodiment of the present invention, the polyol component is selected from a polyol component having an ammonium halide branched structure and a polyol component having an ammonium phosphate structure;

the foaming step is a step of generating a closed-celled water-foamed polyurethane having an ammonium halide branched structure; and the solidifying and depressurizing step includes the steps of: allowing a free amino group generated by the reaction between the ammonium halide branched structure and the metal compound to react with $CO_2$ gas generated in the foaming step; and allowing the obtained compound to react with metal ions of the metal compound to solidify the $CO_2$ gas, thereby depressurizing the closed-cells in the closed-celled foam.

In another embodiment of the present invention, the polyol component contains a compound selected from the group consisting of diol having an ammonium halide branched structure and diamine having an ammonium halide branched structure.

In another embodiment of the present invention, the mixing step comprises the step of dispersing the metal compound in a liquid selected from the group consisting of water, a polyol component, and a mixture of water and the polyol component.

In another embodiment of the present invention, a method for producing a thermal insulator further comprises the step of mixing an epoxide compound, a copolymerization catalyst, water, a polyol component, and an isocyanate component to generate a mixture, wherein the foaming step is a step of foaming the mixture in a container to generate closed-celled foam made of a water-foamed polyurethane, and the solidifying and depressurizing step is a step of allowing $CO_2$ gas generated during the foaming step to be alternatively copolymerized with the epoxide compound to solidify the $CO_2$ gas, thereby depressurizing the closed-cells in the closed-celled foam.

In another embodiment of the present invention, the mixing step comprises a step of previously mixing the epoxide compound with the copolymerization catalyst.

In another embodiment of the present invention, the epoxide compound has a boiling point of 65° C. or less.

In another embodiment of the present invention, the container used during the foaming step is an air-tight container, and the solidifying and depressurizing step is a step of solidifying $CO_2$ gas generated during the foaming step, thereby depressurizing the container as well as cells in the foam.

Thus, the invention described herein makes possible at least one of the advantages of (1) providing a thermal insulator made of closed-celled foams with high insulation characteristic capable of being molded into many shapes; (2) providing a thermal insulator whose high insulation characteristic can be maintained for a long period of time without decreasing the degree of depressurization of the closed-cells; and (3) providing a method for producing a vacuum thermal insulator from a foamed plastic capable of being produced by forming in place, without a step of depressurizing using a vacuum pump and a step of attaching of the insulator as required in the conventional example.

These and other advantages of the present invention will become apparent to those skilled in the art upon reading and understanding the following detailed description with reference to the accompanying figures.

DESCRIPTION OF THE PREFERRED EMBODIMENTS

Figure 1:
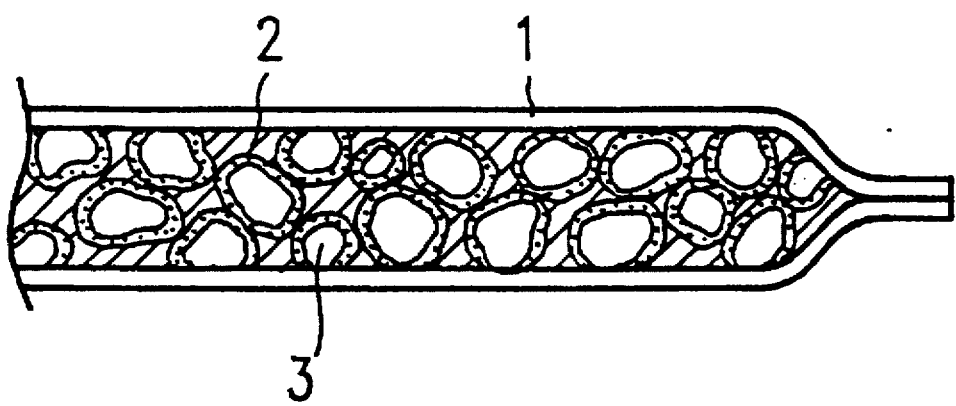
FIG. 1 is a cross section view showing an exemplary construction of a thermal insulator according to the present invention.

The present invention relates to a thermal insulator made of a foamed plastic containing a solidified $CO_2$ gas. The solidification of the $CO_2$ gas refers to the reaction in which the $CO_2$ gas is reacted to generate a metal salt compound or in which the $CO_2$ gas is polymerized to generate a plastic.

The adsorption of the $CO_2$ gas by an adsorbent such as zeolite is an equilibrium reaction (reversible), so that the $CO_2$ gas cannot be sufficiently removed. On the other hand, the solidification of the $CO_2$ gas according to the present invention is a non-equilibrium reaction (irreversible at the normal temperature). Accordingly, the $CO_2$ gas is removed sufficiently.

The solidification of the $CO_2$ gas in the foam used for the thermal insulator according to the present invention is not decreased due to the presence of water, even though water-foamed polyurethane is used for the thermal insulator, the $CO_2$ gas is effectively solidified.

Preferred representative examples of metal salt compounds obtained by solidifying the $CO_2$ gas are as represented by the following Formulae (1) to (4). According to Formulae (1) to (4), metal ions are reacted with the $CO_2$ gas to form a carbonate having high thermal stability. For example, calcium carbonate is dissociated at a temperature higher than about 900° C. As represented by Formulae (1) to (4), a metal oxide or a metal hydroxide, excellent solidifying agents, reacts with the $CO_2$ gas to form a metal carbonate or a metal hydrogencarbonate. Examples of suitable metal salts include those containing alkaline-earth metal. In particular, a calcium salt, a barium salt, and a magnesium salt are the most suitable.

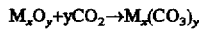  (1)

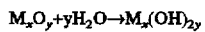  (2)

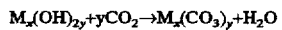  (3)

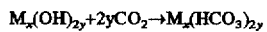  (4)

where M indicates a metallic element, and x and y are integers.

The metal oxide is likely to react with water to form a metal hydroxide as represented by Formula (2). The metal hydroxide is reacted with the $CO_2$ gas to generate a metal carbonate and water as represented by Formula (3). The water is reacted with isocyanate to form polyurethane having a urea bond and simultaneously to generate the $CO_2$ gas, which functions as a blowing agent, as represented by the following Formula (5). The $CO_2$ gas is reacted with a metal oxide or a metal hydroxide to be solidified, resulting in a metal carbonate or a metal hydrogencarbonate, as described above.

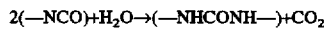  (5)

As described above, the $CO_2$ gas in the plastic foam is solidified and thus, the cells are depressurized.

Representative examples of a system which solidifies the $CO_2$ gas to generate a metal salt compound includes a plastic having a free amino group. In the same way as the above, the solidification of the $CO_2$ gas refers to a reaction in which metal ions are reacted with the $CO_2$ gas to form a metal carbonate. Examples of suitable metal salts include those having alkaline-earth metal such as a calcium salt, a barium salt, and a magnesium salt. Among them, the calcium ions are the most suitable. The following Formulae (6) to (9) represent the reaction of the calcium ions.

$$CaO + CO_2 \rightarrow CaCO_3 \quad (6)$$

$$CaO + H_2O \rightarrow Ca(OH)_2 \quad (7)$$

$$Ca(OH)_2 + CO_2 \rightarrow CaCO_3 + H_2O \quad (8)$$

$$Ca(OH)_2 + 2CO_2 \rightarrow Ca(HCO_3)_2 \quad (9)$$

The reaction of forming a metal carbonate in the plastic foam having a free amino group has a feature of enhancing the solidification of the $CO_2$ gas. More specifically, in a medium having a free amino group, the $CO_2$ gas in the cells is efficiently solidified to form a metal carbonate or a metal hydrogencarbonate as represented by Formulae (6) to (9).

The above-mentioned reaction is similar to a biomineralization mechanism in which a shellfish itself synthesizes a mineral such as a shell in a living body system. In the living body system, as represented by Formula (10), $CO_2$ taken from sea water is first absorbed as ammonium carbonate in a medium (biomembrane) having a lysine of a protein, which is a free amino group, in a high concentration, and the ammonium carbonate is reacted with calcium ions to be solidified as calcium carbonate, as represented by Formula (11). According to the biomineralization mechanism, calcium ions or carbonic acid ions are efficiently condensed to form a calcium carbonate mineral in a space formed by organic substances. The present invention uses a similar reaction to that of the biomineralization mechanism to efficiently solidify $CO_2$.

  (10)

  (11)

Since a free amino group is reacted with isocyanate during the formation of polyurethane, it is preferred that the amino group in the material is changed into ammonium halide or ammonium phosphate to decrease its activity as represented by Formula (12). By using a polyol component having such a structure as a material, water-foamed polyurethane having a urea bond with an ammonium halide branch can be obtained. Thereafter, in the same way as in the solidification of $CO_2$, the halogen anions are reacted with divalent Ca ions of calcium hydroxide to generate a metal halide, e.g., calcium chloride and a free amino group as represented by Formula (13). Even though phosphoric acid ions are used, instead of halogen, to form a metal phosphate, the same effects can be obtained. In Formulae (12) and (13), X represents halogen.

  (12)

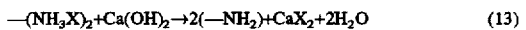  (13)

The water generated in the above reaction is reacted with isocyanate to form polyurethane having a urea bond as represented by Formula (5), and simultaneously to generate $CO_2$ gas. Furthermore, the $CO_2$ gas is reacted with a metal salt compound to be solidified, resulting in a metal carbonate or a metal hydrogencarbonate.

As described above, the $CO_2$ gas in the closed-cells in the foamed plastic is solidified as a metal salt compound, and the $CO_2$ gas is removed from the closed-cells; therefore, the cells are depressurized.

A representative example of the plastic obtained by solidifying the $CO_2$ gas is polycarbonate. In a foamed plastic containing an epoxy compound, the $CO_2$ gas, which has been generated by the reaction of Formula (5) and has functioned as a blowing agent, is resinified by alternant copolymerization reaction with the epoxide compound. According to this polymerization reaction, $CO_2$ gas and an epoxide compound generate polycarbonate by alternant copolymerization reaction as shown in Formula (14). This reaction is easily effected at room temperature in the presence of a copolymerization catalyst such as a metal compound.

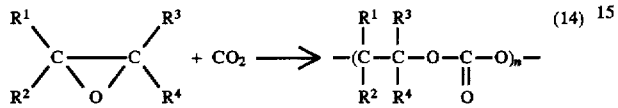
(14)

where $R^1$, $R^2$, $R^3$, and $R^4$ are substituent groups. In Formula (14), the epoxide compound is represented as a three-membered ring ether, but a four or more membered ring will similarly proceed the reaction.

According to the above reaction, the $CO_2$ gas is subjected to alternative copolymerization reaction in the closed-cells of the foamed plastic to be solidified as polycarbonate resin. In this way, the reaction of the $CO_2$ gas in the foamed plastic is effected, so that the $CO_2$ gas in the cells are removed, and the cells are depressurized.

In the case of the epoxide compound having a boiling point of about 65° C. or less, the epoxide compound is vaporized by heat generated by the reaction between the polyol component and the isocyanate component to function as a blowing agent. Thereafter, the epoxide compound is reacted with the $CO_2$ gas. Therefore, the decrease in a vapor component in the cells is promoted, and the cells are more efficiently depressurized.

As described above, the thermal insulator of the present invention has a function of solidifying the $CO_2$ gas working as a blowing agent. Thus, when the foam of the present invention is formed in a container having high hermeticity, a vacuum insulating panel can be formed without depressurizing by using a vacuum pump or the like. Furthermore, when closed-celled foams are formed according to the present invention, the closed-cells are depressurized. Thus, a vacuum insulating foam having closed-cells which are depressurized can be obtained. The "closed-celled foam" used in the present specification refers to a foam having a percentage of closed-cells of 80% or more measured by Air Pycnometer.

The thermal insulator of the present invention has the following many excellent effects and hence is industrially valuable.

1) The $CO_2$ gas which has functioned as a blowing agent is solidified, so that the cells are depressurized, resulting in excellent thermal insulation characteristic.
2) Since the solidification of the $CO_2$ gas in the foam used for the thermal insulator according to the present invention is not decreased due to the presence of water, even though water-foamed polyurethane is used for the thermal insulator, the $CO_2$ gas is effectively solidified.
3) Since the solidified $CO_2$ gas is mainly formed on the cell walls, it has an effect of improving the barrier property of the cell walls. Thus, the closed-celled foam according to the present invention includes each cell surrounded by the cell wall with a high barrier property, so that even though the closed-celled foam is provided in a container made of a material with a low barrier property, a thermal insulator having excellent thermal insulation characteristic can be obtained.
4) Since the solidification of the $CO_2$ gas is effected as the $CO_2$ gas getter for a long period of time, the degree of depressurization of the closed-cells is not decreased.
5) Since a thermal insulator is produced by foaming a plastic in a container with any shape, a vacuum insulating panel with any shape can be obtained almost in the same way as in the conventional polyurethane foaming in place.
6) Since a vacuum insulating panel can be produced without the steps of depressurizing by using a vacuum pump or the like as conducted in the conventional example, a core material is not required to be formed into open-celled foams as in the conventional example, and a vacuum insulating panel made of a closed-celled foam with high insulation characteristic can be obtained.
7) In the case of a polyurethane having closed-cells, the degree of depressurization of the closed-cells is hardly affected, so that high insulation characteristics can be maintained even though pin-holes are formed in the container.

In the case of containing a metal halide or a metal carbonate, the resultant thermal insulator can be made flame-retardant.

EXAMPLES

Hereinafter, the present invention will be described by way of illustrative examples with reference to the accompanying drawings.

Referring to FIG. 1, a thermal insulator of the present invention includes a foamed plastic 2 having closed-cells, and metal carbonate 3 obtained by solidifying $CO_2$ gas with a metal oxide (or a metal hydroxide) in a container 1.

In the container 1, the $CO_2$ gas forms closed-cells during the polymerization of a material for the foamed plastic 2. Thereafter, the $CO_2$ gas is reacted with the metal oxide (or metal hydroxide) to be solidified, resulting in the metal carbonate 3. At this time, the closed-cells are depressurized. For this reason, the foamed plastic 2 is required to be a rigid foamed plastic which is not greatly deformed when the closed-cell in the foam is depressurized.

Preferred examples of the material for the foamed plastic 2 include polyurethane, polystyrene, and polyvinylidene chloride. Water-foamed polyurethane having a urea bond is the most suitable. The water-foamed polyurethane is obtained as follows: Isocyanate which is a material for polyurethane is reacted with water to form a urea bond and to generate $CO_2$ gas which functions as a blowing agent.

A cross-linker can be contained in the material for the foamed plastic 2. The cross-linker cross-links the foamed plastic 2 to enhance its hardness and resistance to deformation under heat. Examples of the cross-linker include compounds having a cross-linking functional group, such as aldehyde, epoxide, isocyanate, and chlorosilane. These compounds produces a cross-linking structure by forming a methylene bond, an epoxy bond, a urethane bond, a urea bond, an allophanate bond, abiuret bond, and an acid amide bond. In the case where these compounds generate reaction gas during the cross-linking reaction, it is required to add an adsorbent for adsorbing the reaction gas so as not to decrease the degree of depressurization in the cells.

A method for producing a thermal insulator of the present invention includes the steps of: mixing a metal oxide or a metal hydroxide, water, a polyol component, and an isocyanate component; foaming the mixture in a container to generate a water-foamed polyurethane with closed-cells having a urea bond; and allowing $CO_2$ gas generated in the foaming step to react with the metal oxide or the metal hydroxide in the closed-cells to be solidified, resulting in a metal carbonate or a metal hydrogencarbonate. Thus, the closed-cells are depressurized. It is preferred to use a dispersion solution in which a metal oxide is previously dispersed in a polyol or a dispersion solution in which a metal hydroxide is previously dispersed in water, a polyol, or a mixture of water and a polyol.

In most cases, the polyol component is prepared by adding the above-mentioned cross-linker, a foam stabilizer, a urethane reaction catalyst, or the like. As the polyol component, high molecular weight compounds having at least two reactive hydrogen atoms are used. Polyester polyol and polyether polyol are preferred.

As the isocyanate component, compounds having at least two isocyanate groups are used. Tolylenediisocyanate, crude diphenylmethanediisocyanate, or an isocyanate mixture or organic polyisocyanate based on these compounds are generally used.

A foam stabilizer, a urethane reaction catalyst, or the like can be added to the above-mentioned components. If required, an antioxidant, a flame retardant, a filler, or the like can be added, provided that it is required to select these additives so as not to volatilize under reduced pressure after the foaming step.

Examples of the foam stabilizer include an organic silicone type surfactant, an aliphatic metal salt, an aliphatic metal sulfonate, and paraffin oil. The organic silicone type surfactant is preferably used. Examples of the urethane reaction catalyst include organic tin type compounds, organic lead type compounds, and highly basic amine type catalysts. The amine type catalysts are preferably used.

In the case of the water-foamed polyurethane, $CO_2$ gas thoroughly dissolves in water, so that a high-pressure carbonic acid solution can be used as a blowing agent. The $CO_2$ gas is generated by the water foaming reaction of isocyanate which is a material for polyurethane. In addition to this, when isocyanate is reacted with various carboxylic acids to form an amide bond, the $CO_2$ gas is generated. $CO_2$ for general foaming can also be used as the blowing agent used in the present invention. As the $CO_2$ used for general foaming, liquefied $CO_2$ and $CO_2$ in a super-critical fluid state are used.

Unlike the conventional vacuum insulating panel obtained by filling a core material in a container and then producing a depressurized state in the core material by using a vacuum pump or the like, the thermal insulator of the present invention is obtained by forming a plastic foam, which has a function of producing a depressurized state in the plastic foam, as a core material in a container. According to the present invention, thus, vacuum insulating panels with various shapes can be obtained. A deformable container made of material with a high barrier property is placed in a mold with a suitable shape and a core material in the container is foamed by heating to obtain a foamed structure, resulting in a vacuum insulating panel. The core material can also be foamed by heating in a rigid sealable container having a metal layer with a suitable shape to obtain another type of vacuum insulating panel.

Figure 2:
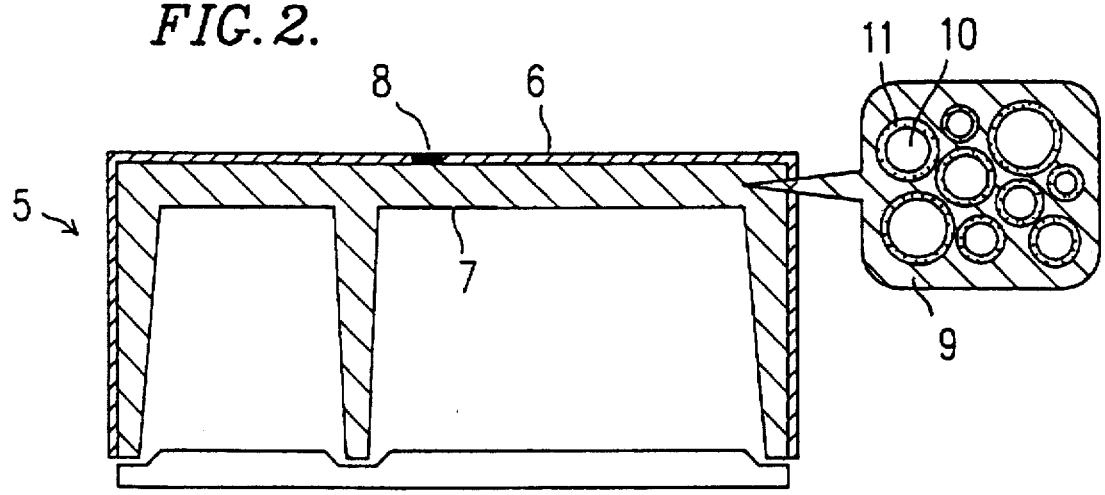
FIG. 2 is a cross section view showing an exemplary construction of a thermal insulator according to the present invention provided in a housing of a refrigerator.

For example, as shown in FIG. 2, the thermal insulator of the present invention is suitable for use in an insulating housing for an electric refrigerator. When the thermal insulating foam of the present invention is filled in a sealable refrigerator housing 5 having an injection port 8, including a metallic outer housing 6 and a plastic inner housing 7, an electric refrigerator with excellent insulation characteristics can be constructed.

In the case where the thermal insulator of the present invention is made of a closed-celled plastic foam 9 having a free amino group, the solidification of the $CO_2$ gas is enhanced. The wall surface of the closed-cells 10 of the foamed plastic 9 contains a metal halide or a metal phosphate and metal carbonate 11 solidified by reacting with the $CO_2$ gas in the closed-cells 10. As compounds having a free amino group, various kinds of compounds can be used. A lysine structure of polypeptide ($-(CH_2)_3CH_2NH_2$) is suitable for the present invention. The plastic having a free amino group used in the present invention is required to be a rigid plastic foam which is not greatly deformed by being depressurized.

A method for producing a thermal insulator made of a closed-celled plastic foam having a free amino group of the present invention is as follows:

A metal oxide or a metal hydroxide, water, a polyol component selected from the group consisting of a polyol component having an ammonium halide structure and a polyol component having an ammonium phosphate structure, and polyisocyanate are mixed. The mixture is injected into a container and reacted to generate a water-foamed rigid polyurethane having a urea bond with an ammonium halide branched structure. The ammonium halide branched structure is reacted with the metal oxide or the metal hydroxide to generate a metal halide or metal phosphate and a free amino group. Furthermore, the $CO_2$ gas in the closed-cells generated during the molding of the polyurethane is adsorbed by the free amino group, and the adsorbed $CO_2$ gas is reacted with metal ions of the metal oxide or the metal hydroxide to generate a metal carbonate. As a result, the $CO_2$ gas is solidified and a thermal insulator in which the cells are depressurized is produced.

The polyol components having an ammonium halide or an ammonium phosphate structure refers to a polyol having an ammonium halide or ammonium phosphate and a composition of a polyol and an organic ammonium halide or ammonium phosphate. In particular, among the polyol components having an ammonium salt branched structure, dioxyalkyl tertiary amine has a reaction catalytic function and is effectively polymerized. The dioxyalkyl tertiary amine has a trialkyl tertiary amine structure where two alkyl groups are substituted by hydroxyl ($-OH$) groups and the other alkyl group is substituted by an ammonium halide structure such as a lysine. Such an auxiliary additive also functions as a cross-linker and a chain extender.

For preparing a material solution, it is preferred to use a dispersion solution in which a metal oxide coated with a hot melt coating is previously dispersed in water, a polyol component having an ammonium halide or an ammonium phosphate structure, or a polyol mixture having water and an ammonium halide structure.

Furthermore, there is the following method for producing a thermal insulator of the present invention in which a compound obtained by solidifying the $CO_2$ gas is a copolymer with an epoxide. A polyol component, water, an epoxide, a copolymerization catalyst, and an isocyanate component are mixed and reacted to generate a foamed polyurethane. At this time, the $CO_2$ gas generated by the reaction between isocyanate and water, and the epoxide compound form an alternative copolymer by the copolymerization catalyst. Thus, the $CO_2$ gas is resinified and the cells are depressurized.

As the epoxide compound of the present invention, compounds having one or two epoxy groups, an oxetane derivative, and a tetrahydrofuran derivative are preferred. Among the epoxy compounds having one epoxy group, those having a boiling point of about 65° C. or less function as a blowing agent. Examples of such compounds include ethylene oxide (11° C.), propylene oxide (34° C.), 1,2-epoxybutane (63° C.), cis-2,3-epoxybutane (60° C.), trans-2,3-epoxybutane (54° C.), and butadiene monoxide (65° C.). The temperatures shown in parentheses are boiling points. Other suitable examples of epoxy compounds having one epoxy group include alkylene oxide compounds such as epoxyhexane, epoxyoctane, epoxydecane, epoxydodecane, epoxyhexadecane, and epoxyoctadecane. Furthermore, compounds having an epoxy group and a double bond unsaturated group such as epoxyhexene and epoxyoctene; compounds having a glycidyl group such as glycidyl methyl ether, glycidyl isopropyl ether, glycidyl acrylate, and phenyl glycidyl ether; and aromatic epoxide compounds such as epoxypropylbenzene and styrene oxide can be used. Furthermore, compounds having two epoxy groups such as diepoxybutane and diepoxyoctane, oligomers having various epoxy groups at both terminals, oxetane having a boiling point of 50° C., and derivatives thereof can be used.

Since some of these epoxide compounds react with a polyol, the epoxide compounds are sometimes formed being bonded to foamed plastic. In the case of using a halogenated epoxide compound such as a brominated epoxide compound, the thermal insulator can be flame-retardant.

As the copolymerization catalyst for effecting alternative polymerization between the $CO_2$ gas and the epoxide compound, metal compounds such as zinc, cobalt, aluminum, and tin are suitable. In particular, a mixture of an organic zinc compound and a compound having hydrogen with two or more valences, organic zinc compounds holding a metal oxide, zinc acetate, a reaction mixture of zinc hydroxide and aliphatic dicarboxylic acid, and zinc halide holding a metal oxide are suitable as the copolymerization catalyst.

As the organic zinc compounds, dialkyl zinc such as diethyl zinc is preferred. As the compounds having divalent or more of active hydrogen, water, primary amine, divalent alcohol, aromatic dicarboxylic acid, aromatic hydroxycarboxylic acid, and the like are suitable.

As the metal oxide holding a zinc compound, silicon oxide, aluminum oxide, titanium oxide, and the like are used. In addition, a metal hydroxide such as magnesium oxide can also be used.

The copolymerization of the $CO_2$ gas and the epoxide compound is effected even when all of the materials are simultaneously mixed. Preferably, by previously mixing the epoxide compound with the copolymerization catalyst, catalytic activity is enhanced and copolymerization proceeds at a high yield.

It is preferred that polycarbonate is formed after the formation of foamed plastic. Therefore, the epoxide compound is placed in a microcapsule and is expanded and ruptured by reaction heat, and thereafter, polycarbonate can be formed.

Figure 3:
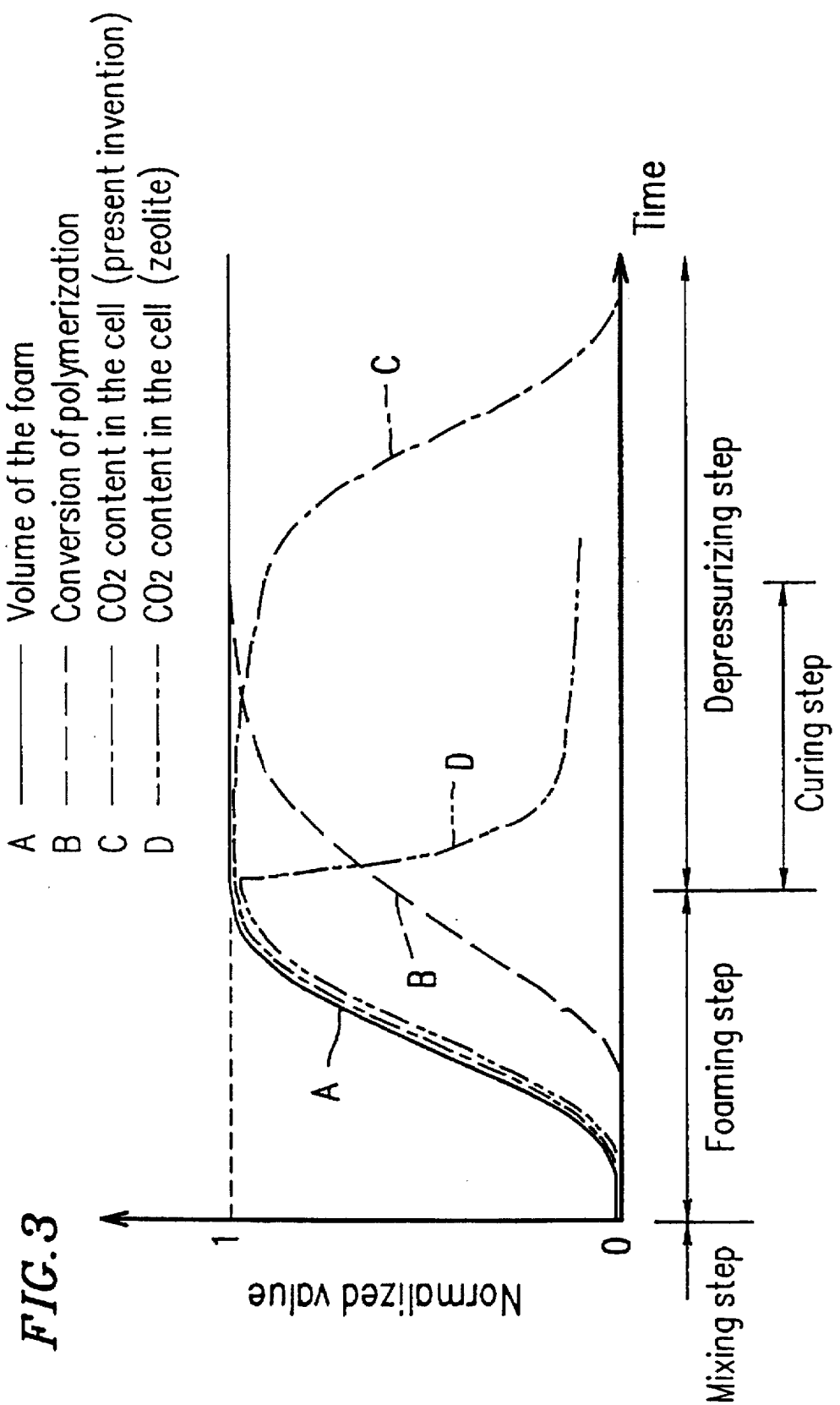
FIG. 3 is a graph showing the producing step of a foam used in a thermal insulator according to the present invention.

The production step of an insulating foam used in a thermal insulator according to the present invention will be described with reference to FIG. 3. In FIG. 3, the changes with time in volume of the foam (line A), conversion of polymerization reaction of a plastic foam (line B), content of $CO_2$ gas in cells of the plastic foam using a solidifying agent of the present invention (line C), and content of $CO_2$ gas in cells of the plastic foam using conventional zeolite (line D). The values of the changes are normalized by the maximum value of each parameter, respectively.

The production step includes a mixing step, a foaming step, a curing step, and a depressurizing step. The depressurizing step according to the invention is a solidifying and depressurizing step. In the foaming step, the volume of the plastic foam (line A) increases by $CO_2$ gas generated by a foaming reaction. At the same time, the conversion of the polymerization of the plastic foam increases. The polymerization reaction proceeds after the foaming step. This step is called the curing step. In the curing step, the plastic foam is completely polymerized and the plastic foam obtains enough mechanical strength. The depressurizing step follows the foaming step. Strictly speaking, the beginning of the depressurizing step depends on the relation between the rate of foaming and that of reducing the $CO_2$ gas in the cell. Typical durations of each step of the production step according to the present invention are as follows. The duration of the foaming step is in the order of several minutes. The duration of the curing step is in the order of several hours. The duration of the solidifying and depressurizing step is in a range of ten hours to several days. These step durations depend on the scale of a system.

The rate of changes in the $CO_2$ gas contents in the cells are very different depending on materials used for reducing the $CO_2$ gas. The solidifying agent of the present invention reduces the $CO_2$ gas well after the conversion of the polymerization is increased enough (line C). Therefore, the plastic foam has enough mechanical strength to keep the depressurized cells undeformed. Thus, according to the present invention, the $CO_2$ gas functions well as the blowing agent and the obtained plastic foam includes the undeformed depressurized cells.

On the other hand, since the adsorption rate of the $CO_2$ gas by zeolite is relatively high, zeolite adsorbs the $CO_2$ gas before the conversion of the polymerization is increased enough. Therefore, the $CO_2$ gas cannot function sufficiently as a blowing agent and the plastic foam does not have enough mechanical strength to keep the depressurized cells undeformed. Accordingly, in order to obtain the sufficient volume of the plastic foam, it is essential to use another blowing agent such as chlorofluorocarbon in addition to the $CO_2$ gas.

In the plastic foam which has an excellent thermal insulating property used in the thermal insulator of the present invention, the size of the cells is preferably equal to or less than 500 microns, more preferably in the range of 100 to 300 microns. The density of the plastic foam is preferably equal to or less than 0.5 g/cm$^3$, more preferably in the range of 0.02 to 0.05 g/cm$^3$. The pressure of the $CO_2$ gas in the cells is preferably less than several torts, more preferably less than tens of torrs.

Example 1

First, milk of lime obtained by allowing 26 parts by weight of calcium oxide to partially react with 4.2 parts by weight of water was mixed with 100 parts by weight of polyol, 1.5 parts by weight of organic silicone type foam stabilizer, 3 parts by weight of amine type catalyst, 1 part by weight of antioxidant, and 1 part by weight of flame retardant. The mixture was mixed while stirring with 162 parts by weight of polyisocyanate in a container at 4,000 r.p.m. for 5 seconds. The resultant mixture was poured into a predetermined container to be foamed, thereby obtaining a closed-celled water-foamed polyurethane having a urea bond.

The $CO_2$ gas in the cells generated during the above step reacted with calcium hydroxide to generate calcium carbonate and to be solidified. Thus, the cells were gradually depressurized, resulting in an excellent thermal insulator. The water vapor generated at this time reacted with calcium oxide to generate calcium hydroxide and to be solidified.

After the container was sealed, the thermal insulation characteristic of the obtained thermal insulator was measured. This revealed that the thermal conductivity of the obtained thermal insulator was 0.010 mW/(m.K) at 24° C. Compared with the thermal conductivity of water-foamed polyurethane (i.e., 0.026 mW/(m.K) at 24° C.) without using calcium oxide, the thermal insulation characteristic of the obtained thermal insulator represented by the reciprocal of the thermal conductivity was about 2.6 times. Furthermore, the change in thermal insulation characteristic was measured over one month, indicating that the thermal insulation characteristic was not deteriorated with time and rather improved.

Example 2

First, 25 parts by weight of calcium oxide was mixed with 100 parts by weight of polyol, 2 parts by weight of organic silicone type foam stabilizer, and 3 parts by weight of amine type catalyst. Then, 4.2 parts by weight of water was added to the mixture. Right after this, the mixture was mixed while stirring with 160 parts by weight of polyisocyanate at 4,000 r.p.m. for 5 seconds. The resultant mixture was poured into a predetermined container to be foamed, thereby obtaining a closed-celled water-foamed polyurethane having a urea bond.

The $CO_2$ gas in the cells generated during the above step reacted with calcium oxide to generate calcium carbonate and calcium hydrogencarbonate. Thus, the cells were gradually depressurized, resulting in an excellent thermal insulator.

After the container was sealed, the thermal insulation characteristic of the obtained thermal insulator was measured. This revealed that the reciprocal of the thermal conductivity of the obtained thermal insulator was about twice that of a thermal insulator produced by using chlorofluorocarbon R11 (trichlorofluoromethane) as a blowing agent.

Example 3

First, 16.2 parts by weight of magnesium hydroxide, 100 parts by weight of polyol, 3 parts by weight of organic silicone type foam stabilizer, 1 part by weight of amine type catalyst, an antioxidant, and a flame retardant were dissolved in 5 parts by weight of water. Then, the mixture was mixed with polyisocyanate which is more than a reaction equivalent of the mixture, and poured into a container and was allowed to be foamed, thereby obtaining closed-celled water-foamed polyurethane having a urea bond.

The $CO_2$ gas in the cells generated during the above step reacted with magnesium hydroxide to generate magnesium carbonate. Thus, the cells were gradually depressurized, resulting in an excellent thermal insulator.

Example 4

First, 18 parts by weight of fine powders of calcium hydroxide was mixed with 100 parts by weight of liquid polyol, 3 parts by weight of organic silicone type foam stabilizer, and 1.5 parts by weight of amine type catalyst. Then, the mixture was mixed with 160 parts by weight of polyisocyanate using 1 part by weight of high-pressure carbonic acid solution as a blowing agent. The resultant mixture was poured into a container and allowed to be foamed, thereby obtaining a closed-celled water-foamed polyurethane having a urea bond.

The $CO_2$ gas in the cells generated during the above step reacted with calcium hydroxide to generate calcium carbonate. Thus, the cells were gradually depressurized, resulting in an excellent thermal insulator.

Example 5

First, 23 parts by weight of milk of lime obtained by dispersing calcium hydroxide in water was mixed while stirring with 129 parts by weight of polyol component solution having an ammonium chloride branched structure obtained by mixing 3 parts by weight of organic silicone type foam stabilizer, 1 part by weight of antioxidant, and 2 parts by weight of amine type catalyst, and 165 parts by weight of polyisocyanate in a container at 4,000 r.p.m. for 5 seconds. The resultant mixture was allowed to be foamed, thereby obtaining a closed-celled water-foamed rigid polyurethane having a urea bond with an ammonium chloride branched structure.

Calcium hydroxide gradually reacted with an ammonium chloride structure as represented by Formula (13) to generate solid calcium chloride and a free amino group. A $CO_2$ gas in the closed-cells generated in the above step reacted with calcium hydroxide as represented by Formula (11) with high efficiency in the presence of a free amino group to generate calcium carbonate. Thus, the closed-cells were gradually depressurized, resulting in an excellent thermal insulator. The polyurethane foam has flame-retardancy.

After the container was sealed, the thermal insulation characteristic of the obtained thermal insulator was measured. This revealed that the reciprocal of the thermal conductivity of the obtained thermal insulator was about 2.3 times that of a closed-celled water-foamed rigid polyurethane without using calcium hydroxide. Furthermore, the change in thermal insulation characteristic was measured over one month, indicating that the thermal insulation characteristic was not deteriorated with time and rather improved.

A polyurethane material similar to that obtained in the above was mixed and injected with a mixing head in a sealable housing for a refrigerator having an injection portion constructed by combining a metallic outer housing with an inner housing made of a rigid plastic. Thus, a vacuum insulating panel for an electric refrigerator having a thermal insulator made of a closed-celled water-foamed rigid polyurethane having a urea bond was obtained.

Example 6

First, 25 parts by weight of calcium oxide particles microcapsulated with an adhesive polyester was mixed with 100 parts by weight of polyol component having an ammonium chloride structure, 3 parts by weight of organic silicone type foam stabilizer, 1 part by weight of antioxidant, and 2 parts by weight of amine type catalyst. Then, the mixture was poured into a container together with 165 parts by weight of polyisocyanate to be foamed, thereby obtaining a closed-celled water-foamed rigid polyurethane having a urea bond.

The $CO_2$ gas in the cells generated during the above step reacted with calcium oxide with high efficiency in the presence of a free amino group to generate calcium carbonate and calcium hydrogencarbonate. Thus, the cells were gradually depressurized, resulting in an excellent thermal insulator.

Example 7

First, 16.2 parts by weight of magnesium hydroxide particles microcapsulated with a hot melt resin, 100 parts by weight of polyol component having an ammonium bromide structure, 3 parts by weight of organic silicone type foam stabilizer, 1 part by weight of antioxidant, and 1 part by weight of amine type catalyst were dissolved in 4.2 parts by weight of water. Then, the mixture and 165 parts by weight of polyisocyanate which was more than a reaction equivalent of the polyol component were mixed while stirring at 4,000 r.p.m. for 10 seconds to be foamed, and poured into a container. Thus, a closed-celled water-foamed rigid polyurethane having a urea bond was obtained. The polyurethane foam has flame-retardancy.

The $CO_2$ gas in the cells generated during the above step reacted with magnesium hydroxide with high efficiency in the presence of a free amino group generated by the reaction between magnesium hydroxide and the ammonium bromide structure to generate magnesium carbonate. Thus, the closed-cells were gradually depressurized, resulting in an excellent flame-retardant thermal insulator.

Example 8

First, 1.8 parts by weight of water as a blowing agent, and 2 parts by weight of a mixture containing 10.6 parts by weight of propylene oxide of an epoxide compound and diethyl zinc/water (1/0.9) as a copolymerization catalyst were added to a mixture containing 100 parts by weight of polyether polyol, 3 parts by weight of silicone type foam stabilizer, and 1.5 parts by weight of amine type catalyst. Then, the resultant mixture was mixed while stirring with 165 parts by weight of polyisocyanate at 4,000 r.p.m. for 5 seconds. The mixture thus obtained was poured into a container to be foamed, thereby obtaining a closed-celled water-foamed polyurethane having a urea bond.

In the above foaming reaction, water was reacted with polyisocyanate to form a urea bond and to generate $CO_2$ gas, and propylene oxide was vaporized by the reaction heat generated during the formation of a urethane bond by polyol and polyisocyanate, whereby the closed-celled polyurethane foam was obtained.

The $CO_2$ gas in the cells generated during the above step reacted with propylene oxide by the copolymerization catalyst to generate an alternative polycarbonate component. Thus, the closed-cells were gradually depressurized, resulting in an excellent thermal insulator.

After the container was sealed, the thermal insulation characteristic of the obtained thermal insulator was measured. This revealed that the reciprocal of the thermal conductivity of the obtained thermal insulator was 0.010 mW/(m.K) at 24° C. Furthermore, the change in thermal insulation characteristic was measured over one month, indicating that the thermal insulation characteristic was not deteriorated with time and rather improved.

For comparison, a foamed polyurethane thermal insulator was produced by using the same polyol, foam stabilizer, catalyst, polyisocyanate, and chlorofluorocarbon R11 as a blowing agent. This foamed polyurethane thermal insulator had a thermal conductivity of 0.014 mW/(m.K) at average 24° C. Thus, the reciprocal of the thermal conductivity of the thermal insulator of the present invention was about 1.4 times that of the comparative thermal insulator.

Example 9

In the same way as in Example 8, 5 parts by weight of water, 3 parts by weight of organic silicone type foam stabilizer, and 2 parts by weight of amine type catalyst were mixed to obtain a polyol mixture. Then, a compound containing 51 parts by weight of dodecane oxide as an epoxide compound and, as a copolymerization catalyst, 5 parts by weight of a solid catalyst holding diethyl zinc in a porous silica was mixed with the polyol mixture. Thereafter, 160 parts by weight of polyisocyanate was mixed with the resultant mixture, and poured into a container made of a laminated film with a gas barrier property. The mixture in the container was allowed to be foamed, thereby obtaining closed-celled polyurethane foam having a urea bond. In this foaming reaction, $CO_2$ gas was generated by the reaction between water and isocyanate, whereby a closed-celled polyurethane foam was formed.

The generated $CO_2$ gas in the cells reacted with dodecane oxide by the copolymerization catalyst to generate an alternative polycarbonate component. Thus, the closed-cells were gradually depressurized, resulting in an excellent thermal insulator.

Example 10

First, 100 parts by weight of liquid polyol, 5 parts by weight of water, 3 parts by weight of organic silicone type foam stabilizer, 1 part by weight of antioxidant, 3 parts by weight of flame retardant, and 1 part by weight of amine type catalyst. Then, 36 parts by weight of diepoxyoctane as an epoxide compound and 6 parts by weight of copolymerization catalyst in which aluminum chloride was held by aluminum oxide. The resultant mixture was poured into a container together with 165 parts by weight of polyisocyanate to be foamed, thereby obtaining a foamed polyurethane with fine closed-cells.

The $CO_2$ gas in the cells generated in the above step reacted with diepoxyoctane to generate an aliphatic polycarbonate component. Thus, the cells were gradually depressurized, resulting in an excellent thermal insulator.

In the present example, some of the epoxide compound functioned as a hardener and cross-liked the foamed polyurethane to form a thermal insulator having excellent mechanical strength. The reciprocal of the thermal conductivity of the thermal insulator was about 3 times that of a closed-celled water-foamed polyurethane obtained without using the epoxy compound.

In the above examples, closed-celled foams were produced. The foams used in the thermal insulator of the present invention are not limited thereto. In the case where the foam is formed in an air-tight container, the foam is not required to be a closed-celled foam. However, in terms of strength as a structure, thermal insulation characteristic, and reliability, the percentage of closed-cells is preferably at least 30%, and more preferably at least 80%. When the percentage of closed cells is lower than 30%, in the case where pin-holes are formed in the container, the thermal insulation characteristic is rapidly decreased, resulting in poor reliability. The percentage of closed-cells can be controlled by the known method in the same way as in the conventional foam.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A thermal insulator comprising a foam having cells with wall surfaces, the foam being formed by gas including $CO_2$ gas and containing a solid carbonate compound formed on wall surfaces of the cells by a chemical reaction of the $CO_2$ gas in the cells under the pressure of an organic component for chemically solidifying the $CO_2$ gas.

2. A thermal insulator according to claim 1, wherein the foam is a closed-celled foam including depressurized closed-cells and the solid carbonate compound is formed on the wall surfaces of the closed-cells.

3. A thermal insulator according to claim 2, wherein the closed-celled foam is a water-foamed rigid polyurethane.

4. A thermal insulator according to claim 2, wherein the solid carbonate compound is a metal salt selected from the group consisting of an alkaline-earth metal carbonate and an alkaline-earth metal hydrogencarbonate.

5. A thermal insulator according to claim 4, wherein the metal salt is selected from the group consisting of a calcium salt, a barium salt, and a magnesium salt.

6. A thermal insulator according to claim 2, wherein the closed-celled foam comprises a plastic having a free amino group as the organic component for chemically solidifying the $CO_2$ gas, a metal compound selected from the group consisting of a metal halide and a metal phosphate, and the solid carbonate compound is a metal carbonate.

7. A thermal insulator according to claim 6, wherein the free amino group is a lysine.

8. A thermal insulator according to claim 2, wherein the closed-celled foam is filled in a housing having a metallic outer housing and a resinous inner housing.

9. A thermal insulator according to claim 1, wherein the foam is filled in a sealed air-tight container.

10. A thermal insulator according to claim 7, wherein the foam is a closed-celled foam.

11. A method for producing a thermal insulator comprising a foam including depressurized cells, comprising the steps of:
generating a foam including cells having wall surfaces formed by gas including $CO_2$ gas; and
solidifying the $CO_2$ gas on the wall surfaces of the cells by a chemical reaction under the presence of an organic component for chemically solidifying the $CO_2$ gas, thereby depressurizing the cells.

12. A method for producing a thermal insulator according to claim 2, wherein the foaming step is a step of generating a closed-celled foam made of a water-foamed polyurethane.

13. A method for producing a thermal insulator according to claim 12, further comprising the step of:
mixing a metal compound selected from the group consisting of an alkaline-earth metal oxide and an alkaline-earth metal hydroxide, water, a polyol component, and an isocyanate component to generate a mixture,
wherein the foaming step is a step of foaming the mixture in a container to generate a close-celled foam made of a water-foamed polyurethane by a foaming reaction of the mixture which generates $CO_2$ gas and the cells are formed by gas including the $CO_2$ gas, and
the solidifying and depressurizing step is a step of allowing the $CO_2$ gas generated during the foaming step to react with the metal compound to form at least one of a metal carbonate and a metal hydrogencarbonate, thereby depressurizing closed-cells in the closed-celled foam.

14. A method for producing a thermal insulator according to claim 13,
wherein the polyol component is selected from a polyol component having an ammonium halide branched structure and a polyol component having an ammonium phosphate structure as the organic component for chemically solidifying the $CO_2$ gas;
the foaming step is a step of generating a closed-celled water-foamed polyurethane having an ammonium halide branched structure; and
the solidifying and depressurizing step includes the steps of: allowing a free amino group generated by a reaction between the ammonium halide branched structure and the metal compound to react with the $CO_2$ gas generated in the foaming step; and allowing the obtained compound to react with metal ions of the metal compound to solidify the $CO_2$ gas, thereby depressurizing the closed-cells in the closed-celled foam.

15. A method for producing a thermal insulator according to claim 13, wherein the polyol component contains a compound selected from the group consisting of diol having an ammonium halide branched structure and diamine having an ammonium halide branched structure.

16. A method for producing a thermal insulator according to claim 13, wherein the mixing step comprises the step of dispersing the metal compound in a liquid selected from the group consisting of water, a polyol component, and a mixture of water and the polyol component.

17. A method for producing a thermal insulator according to claim 16, further comprising the step of mixing an epoxide compound as the organic component for chemically solidifying the $CO_2$ gas, a catalyst for solidifying $CO_2$ gas, water, a polyol component, and an isocyanate component to generate a mixture,
wherein the foaming step is a step of foaming the mixture in a container to generate closed-celled foam made of a water-foamed polyurethane by a foaming reaction of the mixture which generates $CO_2$ gas and the cell are formed by gas including the $CO_2$ gas, and the solidifying and depressurizing step is a step of allowing the $CO_2$ gas generated during the foaming step to be reacted with the epoxide compound using the catalyst to form an organic carbonate, thereby depressurizing the closed-cells in the closed-celled foam.

18. A method for producing a thermal insulator according to claim 17, wherein the mixing step comprises a step of previously mixing the epoxide compound with the copolymerization catalyst.

19. A method for producing a thermal insulator according to claim 18, wherein the epoxide compound has a boiling point of 65° C. or less.

20. A method for producing a thermal insulator according to claim 18, wherein the container used during the foaming step is an air-tight container, and the solidifying and depressurizing step is a step of solidifying $CO_2$ gas generated during the foaming step, thereby depressurizing the container as well as cells in the foam.

21. A method for producing a thermal insulator according to claim 17, wherein the catalyst for solidifying $CO_2$ gas is a copolymerization catalyst and the organic carbonate is an alternant copolymer carbonate.

22. A thermal insulator according to claim 8, wherein the metal carbonate is calcium carbonate.

23. A thermal insulator according to claim 2, wherein the foam includes a catalyst for the chemical reaction of an epoxide compound as the organic component for chemically solidifying the $CO_2$ gas and the $CO_2$ gas and the solid carbonate compound is an organic carbonate formed by the chemical reaction of the epoxide compound and the $CO_2$ gas in the cells.

24. A thermal insulator according to claim 23, wherein the organic carbonate compound comprises an alternant copolymer component of the epoxide compound and the $CO_2$ gas.

25. A thermal insulator according to claim 24, wherein the catalyst is a copolymerization catalyst and a compound of metal selected from the group consisting of zinc, cobalt, aluminum, and tin.

26. A thermal insulator according to claim 25, wherein the copolymerization catalyst is selected from the group consisting of a mixture of an organic zinc compound and a compound having active hydrogen with at least two valences, an organic zinc compound carried on a metal oxide, a zinc acetate, and a zinc halide compound carried on a metal oxide.

* * * * *

UNITED STATES PATENT AND TRADEMARK OFFICE
CERTIFICATE OF CORRECTION

PATENT NO. : 5,693,685
DATED : December 2, 1997
INVENTOR(S) : Yoshio Kishimoto et al.

It is certified that error appears in the above-indentified patent and that said Letters Patent is hereby corrected as shown below:

Claim 12, line 2, change "claim 2" to --claim 11--.
Claim 17, line 2, change "claim 16" to --claim 12--.
Claim 20, line 2, change "claim 18" to --claim 17--.
Claim 22, line 1, change "claim 8" to --claim 7--.

Signed and Sealed this

Fourth Day of August, 1998

Attest:

BRUCE LEHMAN

Attesting Officer

Commissioner of Patents and Trademarks